(12) United States Patent
Yuan

(10) Patent No.: US 7,916,403 B2
(45) Date of Patent: Mar. 29, 2011

(54) METHOD FOR MANUFACTURING IR CUT-OFF FILTER COATED LENS ARRAY

(75) Inventor: Kun-I Yuan, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 148 days.

(21) Appl. No.: 12/463,429

(22) Filed: May 11, 2009

(65) Prior Publication Data

US 2009/0303615 A1    Dec. 10, 2009

(30) Foreign Application Priority Data

Jun. 4, 2008 (CN) .......................... 2008 1 0301981

(51) Int. Cl.
*G02B 3/00* (2006.01)
(52) U.S. Cl. ...................................... 359/722; 359/619

(58) Field of Classification Search .................. 359/722, 359/723, 619
See application file for complete search history.

(56) References Cited

U.S. PATENT DOCUMENTS

| 6,635,941 | B2 * | 10/2003 | Suda ............................. 257/431 |
| 2004/0185588 | A1 * | 9/2004 | Fukuyoshi et al. ............. 438/22 |
| 2005/0161841 | A1 * | 7/2005 | Bolle ............................. 264/1.7 |
| 2007/0248791 | A1 * | 10/2007 | Hartig ............................. 428/98 |

* cited by examiner

*Primary Examiner* — Timothy J Thompson
(74) *Attorney, Agent, or Firm* — Raymond J. Chew

(57) ABSTRACT

An exemplary method for manufacturing an infrared (IR) cut-off filter coated lens array includes: providing a light pervious panel having a first surface and a second surface at opposite sides thereof; forming an infrared cut-off filter film on the first surface of the light pervious panel; and forming a plurality of discrete lens structures on the second surface of the light pervious panel through a photolithography process.

6 Claims, 12 Drawing Sheets

METHOD FOR MANUFACTURING IR CUT-OFF FILTER COATED LENS ARRAY

BACKGROUND

1. Technical Field

The disclosure relates to optical lenses, and particularly, to an infrared (IR) cut-off filter coated lens array, and a method for manufacturing the lens array.

2. Description of Related Art

Optical lenses, such as aspheric lenses or spherical lenses, are key elements of a camera. When a single lens is manufactured, an optical film can be formed on the lens by using an evaporation process, or another coating method such as sputtering. The optical film enhances the optical performance of the lens, and can for example be an anti-reflection film, an IR cut-off film, etc.

Generally, when coating an optical film on a surface of the lens using an evaporation process, a clamping apparatus, such as a clamping jaw, may firstly be provided to hold the lens in a vacuum evaporation device. Then a functional material can be evaporated on the surface of the lens to form the optical film. However, the clamping apparatus may be in contact with peripheral sides of the lens when holding the lens. Thus the periphery of the surface of the lens may fail to be coated with the functional material. When this happens, the optical performance of the coated lens may be diminished in certain applications.

Therefore, an IR cut-off filter coated lens and a method for manufacturing such lens are desired to overcome the shortcomings described above.

BRIEF DESCRIPTION OF THE DRAWINGS

Many aspects of the present exemplary IR cut-off filter coated lens array and the method for manufacturing such lens array can be better understood with reference to the following drawings. The components in the drawings are not necessarily drawn to scale, the emphasis instead being placed upon clearly illustrating the principles of the present exemplary lens array and method for manufacturing such lens array. Moreover, in the drawings, like reference numerals designate corresponding parts throughout the several views.

DETAILED DESCRIPTION

Figure 1:
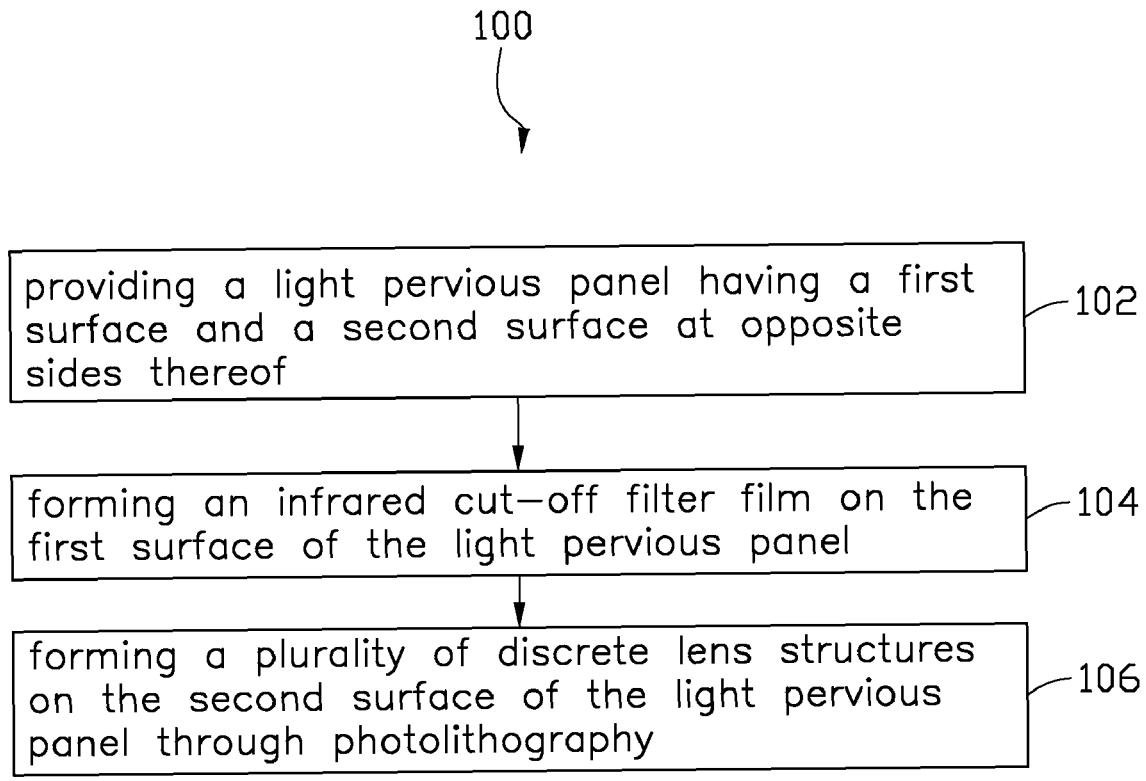
FIG. 1 is a flow chart of a method for manufacturing an IR cut-off filter coated lens array, in accordance with one embodiment.

Referring to FIG. 1, a method 100 for manufacturing an IR cut-off filter coated lens array in accordance with an exemplary embodiment is summarized.

Referring also to FIGS. 2 to 11, the method 100 is described in detail below.

Figure 2:
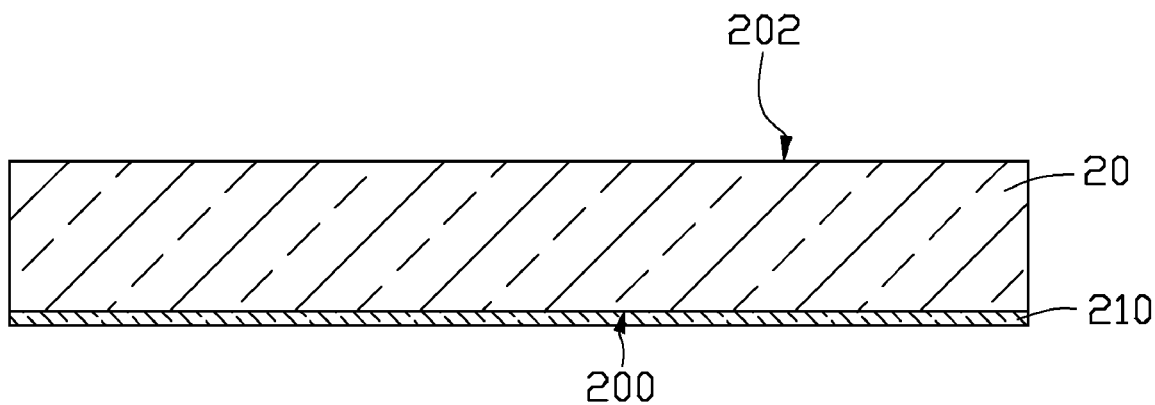
FIG. 2 is a cross-sectional view of a panel with an IR cut-off filter coated thereon, the panel being used in the method of FIG. 1.

In step 102, a flat light pervious panel 20 having a predetermined thickness is provided, as shown in FIG. 2. The panel 20 has a first surface 200 and a second surface 202 at opposite sides thereof. The panel 20 can be made of optical glass or optical plastic. A material of the optical plastic can for example be one of polymethyl methacrylate (PMMA), polycarbonate (PC), etc.

In step 104, the panel 20 is placed into a vacuum evaporation device (not shown). In the vacuum evaporation device, an IR cut-off filter film 210 is coated on the surface 200 of the panel 20 by an evaporation process. The IR cut-off filter film 210 can be a multi-layer structure including at least one layer with infrared reflection properties.

Figure 3:
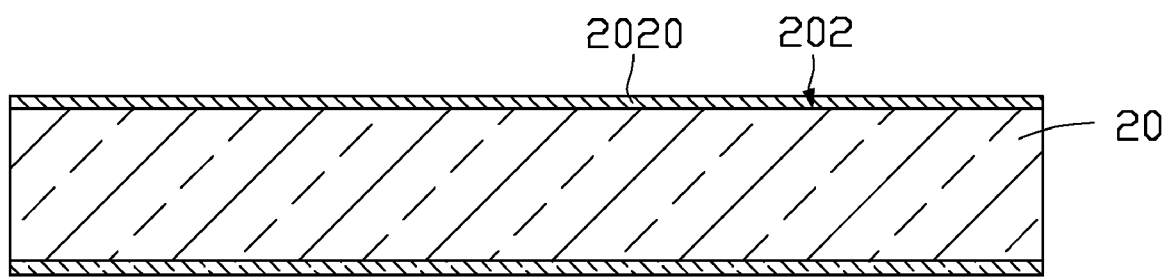
FIG. 3 is similar to FIG. 2, but showing a photoresist film also coated on the panel.
Figure 4:
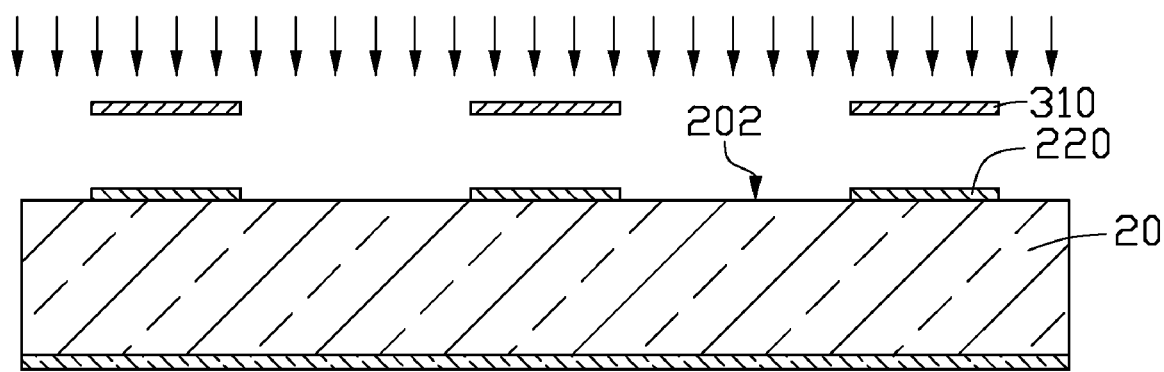
FIG. 4 is similar to FIG. 3, but showing a first exposure and developing process applied to the panel.
Figure 5:
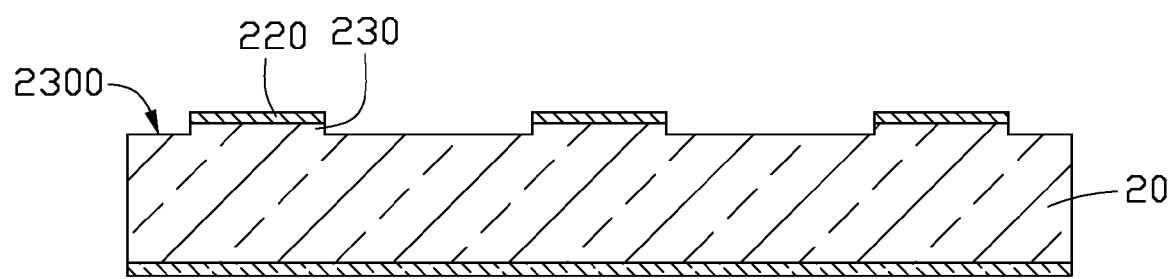
FIG. 5 is similar to FIG. 4, but showing the panel after a first etching process has been applied thereto.

In step 106, a lens array panel 500 is formed by applying several photolithography cycles (processes) to the panel 20, one cycle after another. In each photolithography cycle, an exposure and developing process and an etching process are used in sequence. Referring to FIGS. 3 and 4, when applying an exposure and developing process for the first time, a photoresist film 2020 is coated on the second surface 202 and exposed to ultraviolet (UV) light, with a number of first round masks 310 (there are three first round masks 310 shown in FIG. 4) being arranged over the photoresist film 2020. The first round masks 310 are configured for blocking a number of areas of the photoresist film 2020 from being exposed to the UV light. Thus after the exposure process, a developer can be used to remove the other areas of the photoresist film 2020 that were not protected by the first round masks 310. Thereby, a number of round photoresist regions 220 remain on the second surface 202. Each photoresist region 220 has the same size as the corresponding first round mask 310. Then in the following first etching process, etchant, such as hydrofluoric acid, is applied on the second surface 202. The panel 20 is thus etched to expose a surface 2300, with a number of first steps 230 of the panel 20 protruding out from the surface 2300 being formed, as shown in FIG. 5. Each of the first steps 230 is coated with one photoresist region 220, and has the same size as the corresponding first round mask 310.

Figure 6:
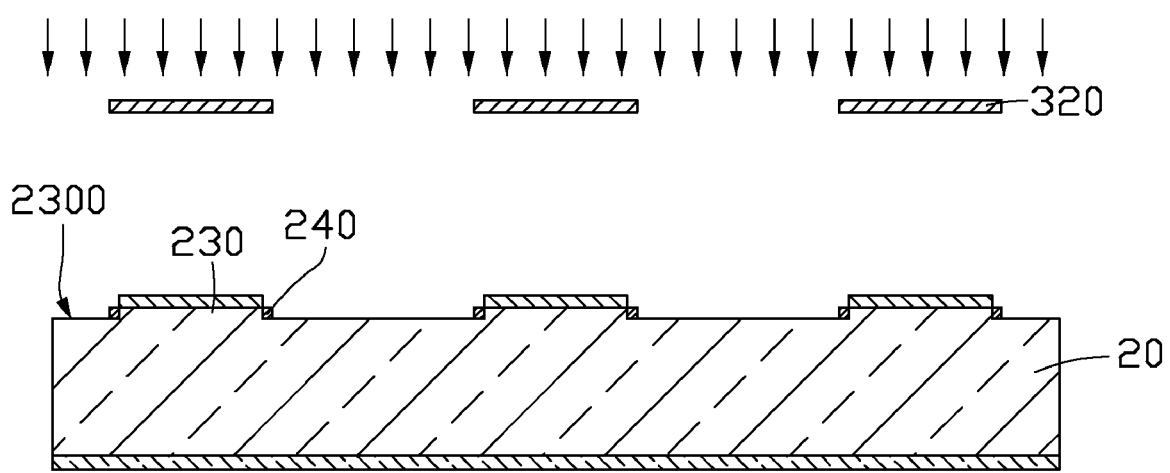
FIG. 6 is similar to FIG. 5, but showing a second exposure and developing process applied to the panel.
Figure 7:
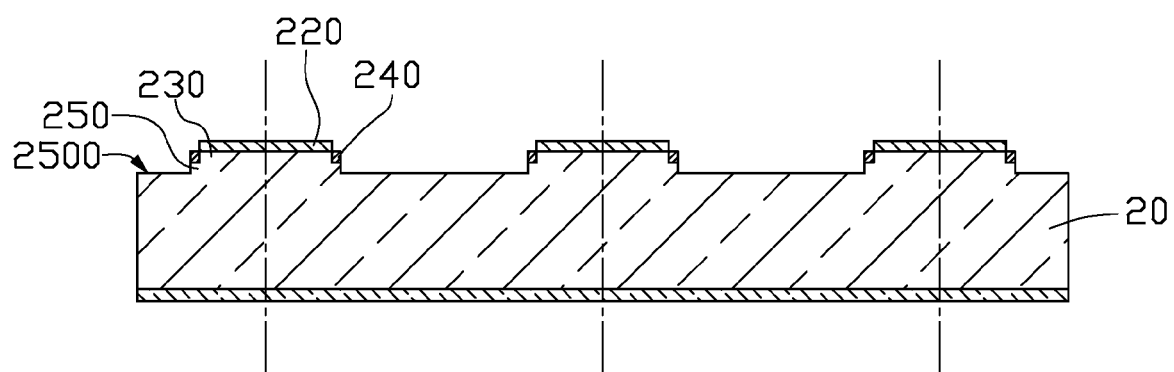
FIG. 7 is similar to FIG. 6, but showing the panel after a second etching process has been applied thereto.

Subsequently, an exposure and developing process is applied for the second time. That is, the surface 2300 is coated with photoresist film (not shown), and a number of second round masks 320 are arranged over the photoresist film, as shown in FIG. 6. The number of second round masks 320 is same as that of the first round masks 310 in the previous photolithography cycle. Each second round mask 320 is larger than the corresponding first round mask 310, and is positioned to be coaxial with the position previously occupied by the first round mask 310. When developer is used to remove the photoresist film in the areas that were not protected by the second round masks 320, a number of first annular photoresist regions 240 remain on the surface 2300. Each first annular photoresist region 240 surrounds the corresponding first step 230. A circumference of each first annular photoresist region 240 is the same as that of the corresponding second round mask 320, as seen in FIG. 6. Then the panel 20 is etched by applying etchant on the surface 2300 to expose a surface 2500. Thereby, a number of second steps 250 of the panel 20 protruding out from the surface 2500 are formed. Each second step 250 has the same circumference as that of the corresponding second round mask 320, and has one first step 230 above. The first and second steps 230, 250 are coaxial, as shown in FIG. 7.

Figure 8:
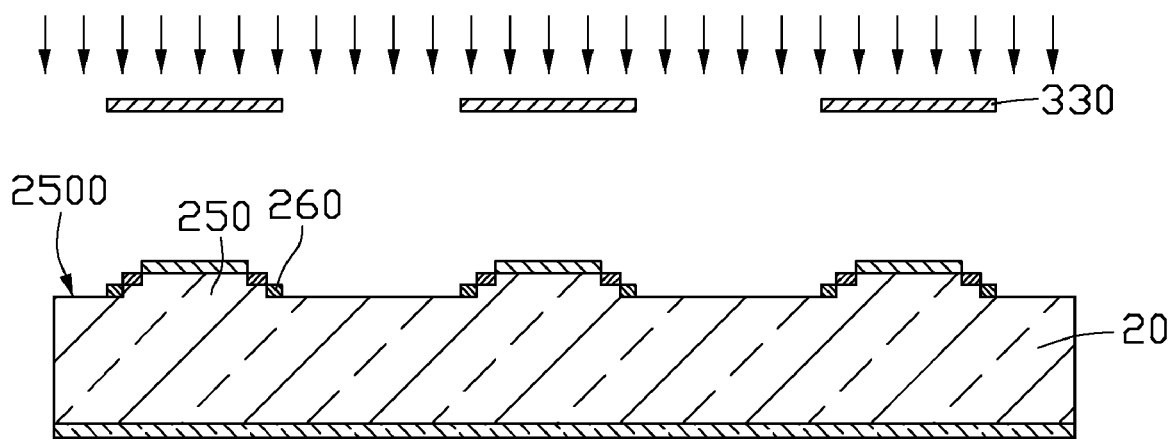
FIG. 8 is similar to FIG. 7, but showing a third exposure and developing process applied to the panel.
Figure 9:
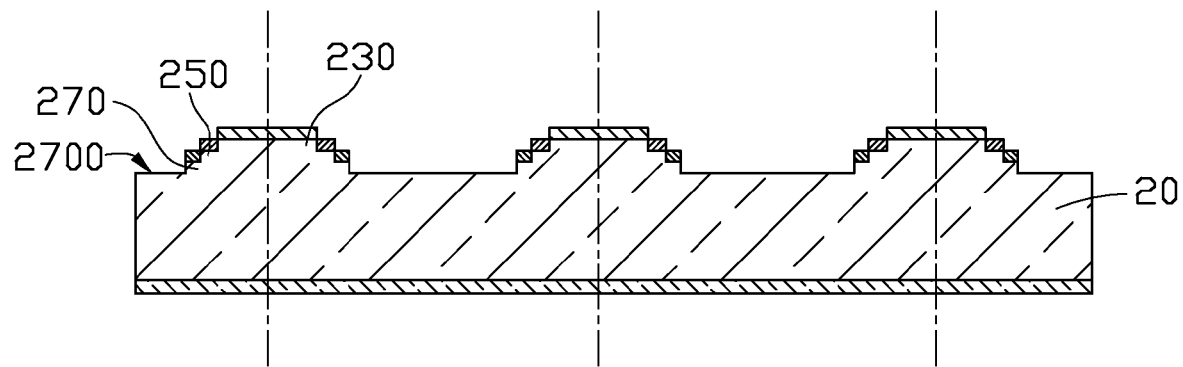
FIG. 9 is similar to FIG. 8, but showing the panel after a third etching process has been applied thereto.

Similar to FIGS. 6 and 7, FIGS. 8 and 9 show a process for forming a number of third steps 270 by applying an exposure and developing process for the third time. In FIG. 8, a number of third round masks 330 which are larger than the second round masks 320 are provided, and subsequently a number of second annular photoresist regions 260 remain on the surface 2500. Each second annular photoresist region 260 surrounds the corresponding second step 250. A circumference of each second annular photoresist region 260 is the same as that of the corresponding third round mask 330. When the panel 20 is etched by applying etchant on the surface 2500 to expose a surface 2700, a number of third steps 270 of the panel 20 protruding out from the surface 2700 are formed. Each third step 270 has the same circumference as that of the corresponding third round mask 330, and has one first step 230 and one second step 250 above. The first, second and third steps 230, 250 and 270 are coaxial, as shown in FIG. 9.

Figure 10:
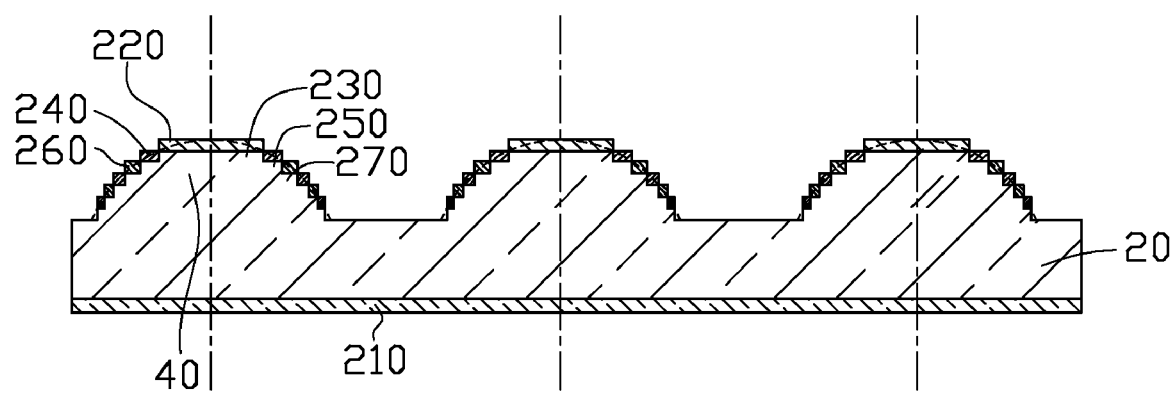
FIG. 10 is similar to FIG. 9, but showing the panel after all exposure and developing processes and all but one of etching processes have been completed, the panel including a number of lens structures each with photoresist films coated thereon.

The above-described photolithography cycles are applied another three times by successively using round masks having an increased size in each cycle. Thus, the panel 20 as shown in FIG. 10 is formed. The panel 20 has the IR cut-off filter film 210 coated on the bottom side; and the photoresist films, including the round photoresist regions 220, the first annular photoresist regions 240, and the second annular photoresist regions 260 coated on the opposite top side. It is understood that the sizes of the round masks successively increase with each successive cycle of exposure and developing and etching processes that is applied. Thus the sizes of the first step 230, the second step 250, the third step 270, and subsequent steps correspondingly increase in that order. In each set of steps including the first step 230, the second step 250, the third step 270, and the other steps, all these steps are coaxial with one another and cooperatively constitute a lens structure 40.

Figure 11:
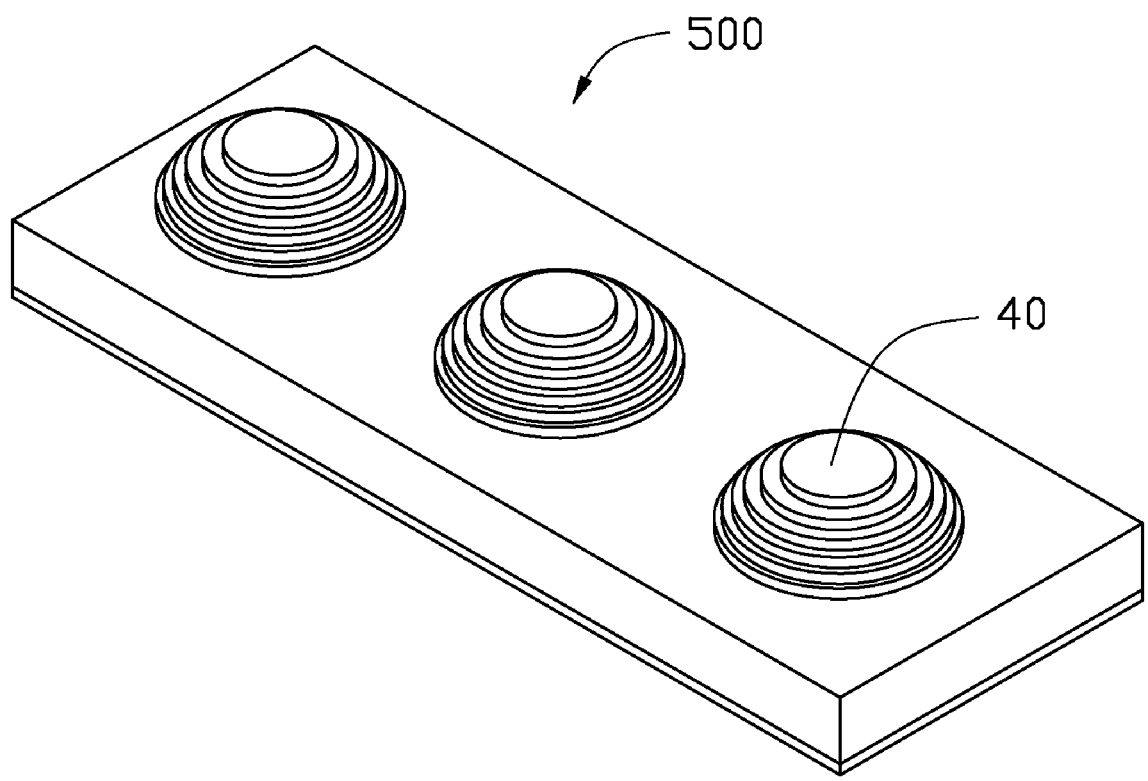
FIG. 11 is a schematic, isometric view of the panel of FIG. 10 after all the photoresist films coated thereon have been removed, such processed panel constituting a lens array panel.

Finally, a last etching process is applied on the panel 20 to remove all the photoresist films, including the round photoresist regions 220, the first annular photoresist regions 240, and second annular photoresist regions 260. Thereby, a lens array panel 500 including a number of the lens structures 40 integrally formed therewith is obtained, as shown in FIG. 11.

Figure 12:
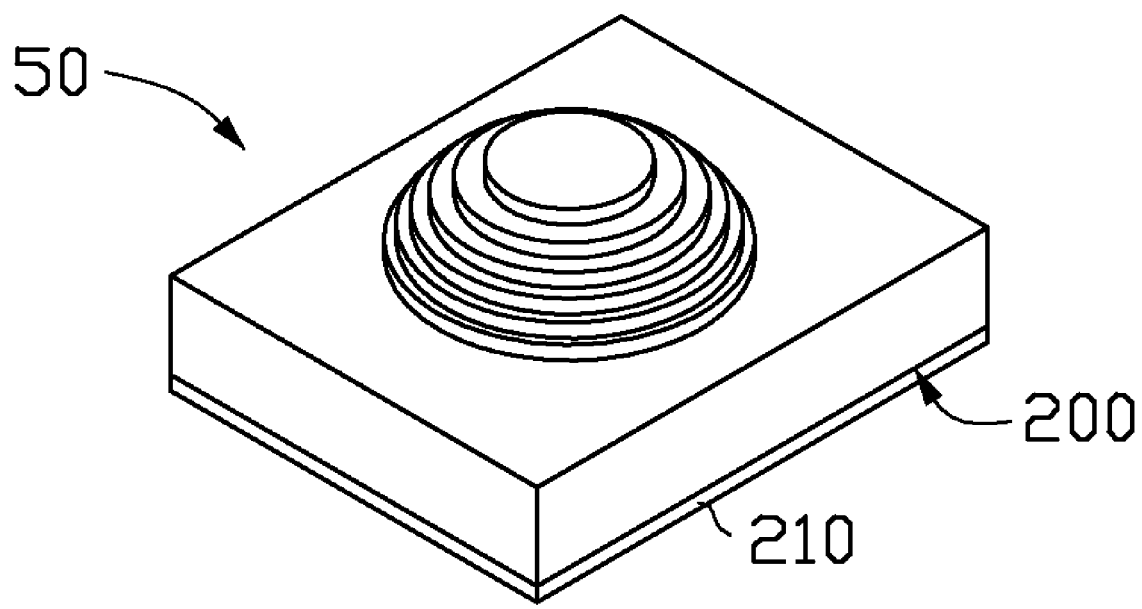
FIG. 12 is similar to FIG. 11, but only showing a single lens after it has been separated from the lens array panel, the lens having the IR cut-off filter coated thereon.

The lens array panel 500 can be cut by a wafer dicing saw (not shown). Thereby, the lens structures 40 are separated from one another, with each lens structure 40 together with the corresponding cut-off portion of the panel 20 constituting a single lens 50. Each single lens 50 has the IR cut-off filter film 210 coated thereon, as seen in FIG. 12. When each lens structure 40 has a roughly spherical outline (as illustrated), the corresponding single lens 50 separated from the lens array panel 500 is substantially a spherical lens.

It is noted that in alternative embodiments, when each lens structure 40 has a roughly aspheric outline, the corresponding single lens 50 separated from the lens array panel 500 is substantially an aspheric lens.

The wafer dicing saw can be selected from a group consisting of a quartz wafer dicing saw and a silicon wafer dicing saw. In alternative embodiments, the lens array panel 500 can be cut using another device, such as a laser cutting machine.

One advantage of the single lens 50 with the IR cut-off filter film 210 coated thereon is that the IR cut-off filter film 210 covers the entire first surface 200 of the single lens 50. Thus the single lens 50 can provide high optical performance in a wide variety of applications. This advantage is achieved by coating the entire first surface 200 with the IR cut-off filter film 210, and subsequently separating each single lens 50 from the lens array panel 500. Another advantage yielded by the above-described method is that a plurality of the single lenses 50 can be obtained from one execution of the method.

It is to be understood that the above-described embodiments are intended to illustrate rather than limit the invention. Variations may be made to the embodiments without departing from the spirit of the invention as claimed. The above-described embodiments are intended to illustrate the scope of the invention and not restrict the scope of the invention.

What is claimed is:

1. A method for manufacturing an infrared (IR) cut-off filter coated lens array, the method comprising:
   providing a light pervious panel having a first surface and a second surface at opposite sides thereof;
   forming an infrared cut-off filter film on the first surface of the light pervious panel; and
   forming a plurality of discrete lens structures on the second surface of the light pervious panel through photolithography, wherein the photolithography comprises a plurality of photolithography processes, and each photolithography process comprises coating a photoresist onto the second surface of the light pervious panel.

2. The method of claim 1, wherein the infrared cut-off filter film is formed by using one of an evaporation process and a sputtering process.

3. A method for manufacturing an infrared (IR) cut-off filter coated lens array, the method comprising:
   providing a light pervious panel having a first surface and a second surface at opposite sides thereof;
   forming an infrared cut-off filter film on the first surface of the light pervious panel; and
   forming a plurality of lens structures on the second surface of the light pervious panel by applying a plurality of photolithography cycles, wherein each photolithography cycle comprises:
   coating a photoresist onto the second surface of the light pervious panel;
   exposing the photoresist using a plurality of round masks;
   removing portions of the photoresist not protected by the round masks; and
   etching portions of the second surface which are exposed;
   wherein each of the round masks applied in each subsequent photolithography cycle is larger than a corresponding one of the round masks applied in the immediately preceding photolithography cycle, and is positioned coaxial with the position of the corresponding round mask applied in the immediately preceding photolithography cycle.

4. The method of claim 3, wherein the infrared cut-off filter film is formed by using one of an evaporation process and a sputtering process.

5. A method for manufacturing an infrared (IR) cut-off filter coated lens array, the method comprising:
   providing a light pervious panel having a first surface and a second surface at opposite sides thereof;
   forming an infrared cut-off filter film on the first surface of the light pervious panel; and
   forming a plurality of discrete lens structures on the second surface of the light pervious panel through photolithography wherein the plurality of lens structures are formed by applying a plurality of photolithography cycles each using a plurality of round masks, and each of the round masks applied in each subsequent photolithography cycle is larger than a corresponding one of the round masks applied in the immediately preceding photolithography cycle, and is positioned coaxial with the position of the corresponding round mask applied in the immediately preceding photolithography cycle.

6. The method of claim 5, wherein the infrared cut-off filter film is formed by using one of an evaporation process and a sputtering process.

* * * * *